United States Patent [19]

Durell

[11] Patent Number: 4,859,029
[45] Date of Patent: Aug. 22, 1989

[54] VARIABLE RATIO BEAM SPLITTER AND BEAM LAUNCHER

[76] Inventor: William E. Durell, 41310 N. Westlake, Antioch, Ill. 60002

[21] Appl. No.: 217,433

[22] Filed: Jul. 11, 1988

Related U.S. Application Data

[63] Continuation-in-part of Ser. No. 881,933, Jul. 3, 1986, Pat. No. 4,787,710.

[51] Int. Cl.$^4$ .................. G02B 27/10; G02B 27/14; G02B 6/26; G02B 6/32
[52] U.S. Cl. .................. 350/173; 350/286; 350/287; 350/163; 350/96.18; 350/96.20; 350/321
[58] Field of Search .............. 350/173, 171, 169, 286, 350/287, 163, 486, 96.18, 96.20, 321

[56] References Cited

U.S. PATENT DOCUMENTS

| | | | |
|---|---|---|---|
| 3,788,733 | 1/1974 | Breglia et al. | 350/287 |
| 3,870,398 | 3/1975 | Love | 350/173 |
| 4,431,258 | 2/1984 | Fye | 350/173 |
| 4,652,095 | 3/1987 | Mauro | 350/321 |
| 4,671,613 | 6/1987 | Bohrer | 350/173 |
| 4,723,841 | 2/1988 | Roy et al. | 350/173 |

FOREIGN PATENT DOCUMENTS

| | | | |
|---|---|---|---|
| 2516254 | 5/1983 | France | 350/173 |
| 55-35354 | 3/1980 | Japan | 350/96.19 |

*Primary Examiner*—Jon W. Henry
*Attorney, Agent, or Firm*—Kinzer, Plyer, Dorn, McEachran & Jambor

[57] ABSTRACT

A continuously variable ratio beam splitter and beam launcher for dividing an input light beam, particularly a polarized coherent light beam, into two output beams, within a broad intensity variation range between the beams which may approach zero to 100%, without loss of polarization, comprises an optical array on a support adjustably mounted on a frame; the optical array includes an optical divider aligned with a penta prism that effectively couples the optical divider to one side surface of a right angle output prism. The optical divider and the output prism launch two output beams, based on division of the light from the input beam impinging on the optical divider. Variation of the intensity ratio of the output beams is accomplished by rotating the optical array support about a pivot point aligned with the input beam so that the input beam strikes the optical divider at different angles. Each output beam is picked up by an optical fiber or like transmission element previously located at a fixed position on the frame of the device. The output beams are always aligned along essentially the same output paths, regardless of changes in the angular orientation of the optical array, so that the amplitude ratio between the two output beams can be changed merely by rotational adjustment of the optical array without refocusing or adjusting other components of the device.

40 Claims, 6 Drawing Sheets

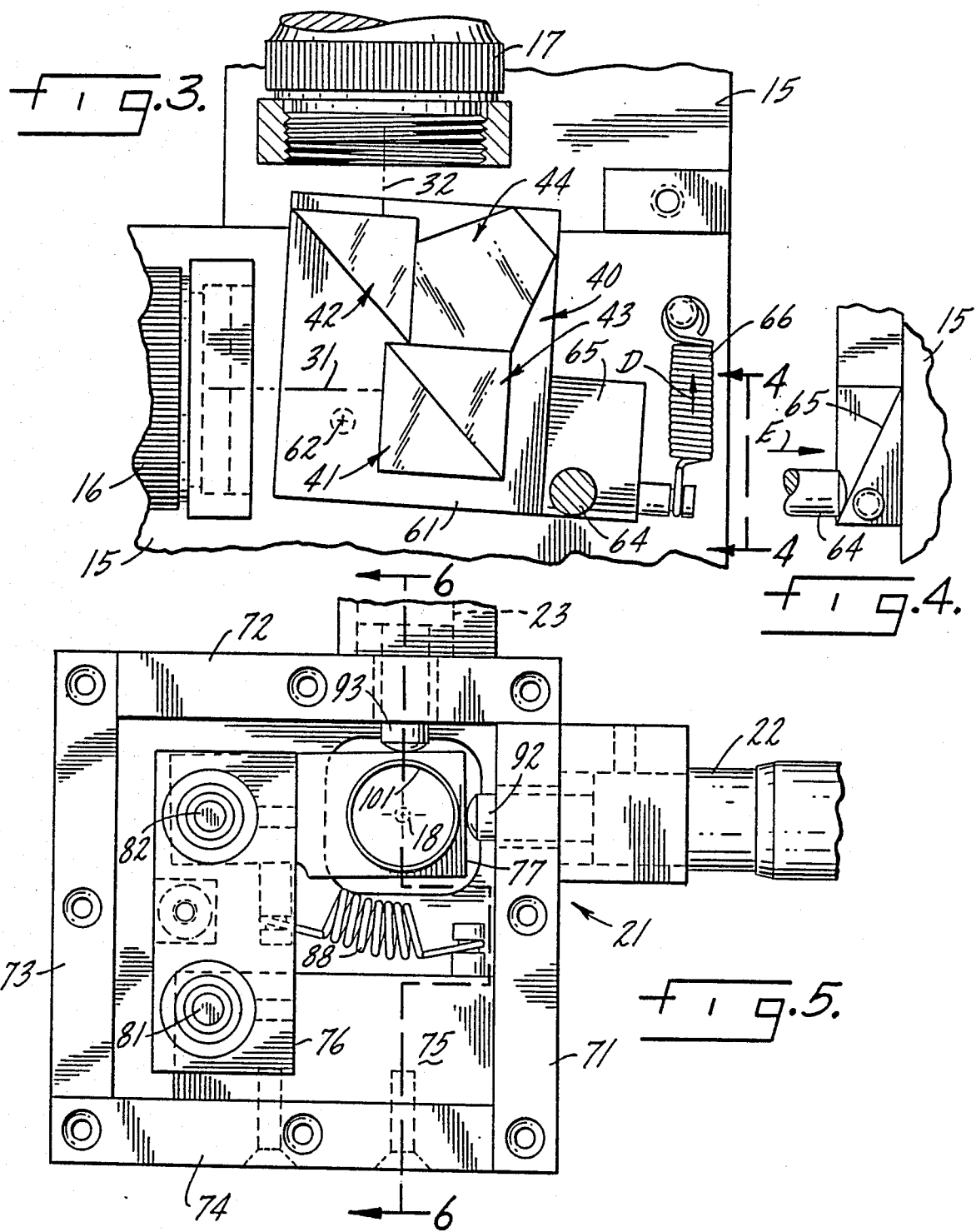

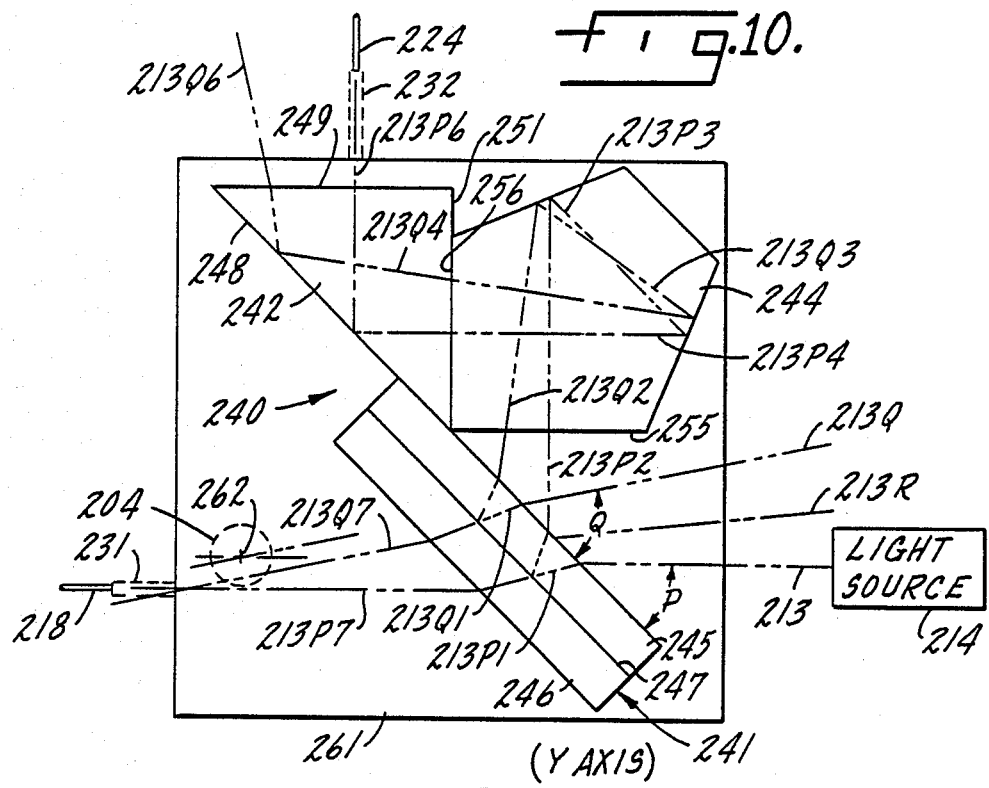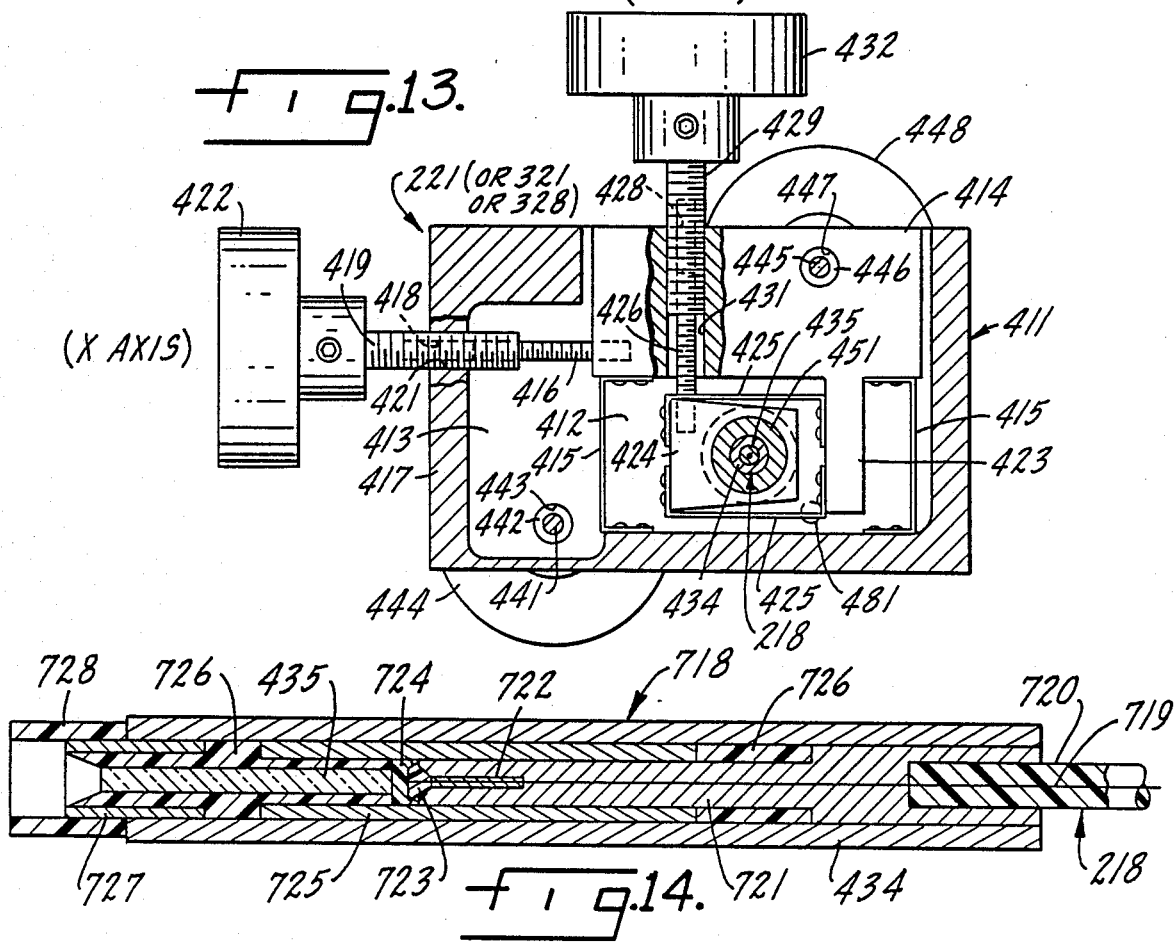

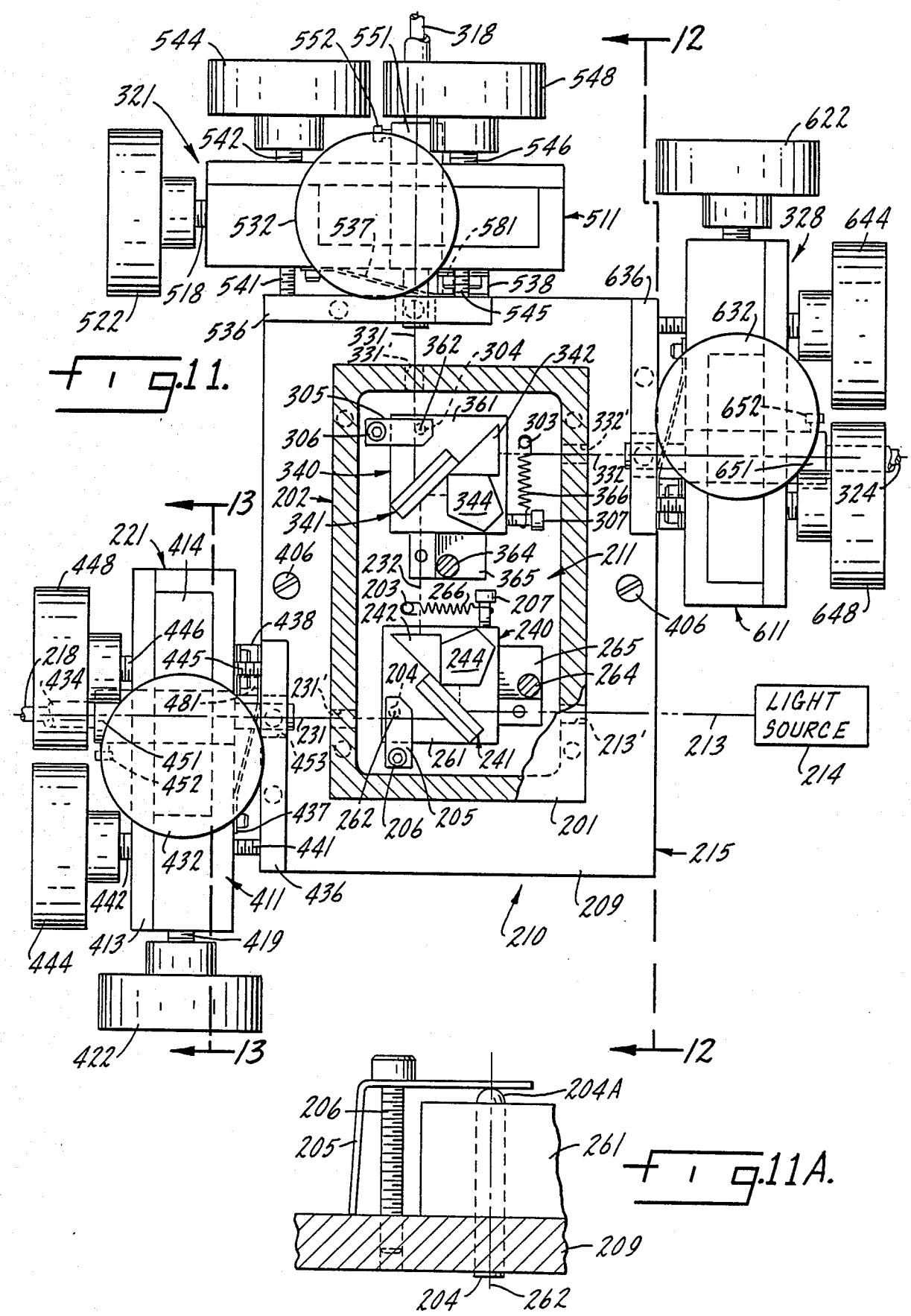

VARIABLE RATIO BEAM SPLITTER AND BEAM LAUNCHER

BACKGROUND OF THE INVENTION

Beam splitters for coherent light beams, usually beams generated by lasers, are used in a variety of applications, including holography and interferometry. Some such applications need to be capable of directing a full range, from near zero to essentially 100% of the input light, to either output beam. The beam splitters known in the art have generally been unduly complex and expensive, particularly for applications demanding a broad ratio of intensities for the split beams. In some systems adjustments or variations of several components have been required each time the beam splitting ratio changes. Moreover, present methods of dividing laser radiation and directing it to photographic material and to an object from which a hologram is to be made require splitters, mirrors, lenses, filters of various sorts, and other specialized equipment, which makes setup difficult and very limiting due to the complexity of the machinery. Furthermore, such setups are susceptible to major errors when subjected to virtually any vibration or like disturbance occurring during operation. Constant re-alignment may be required.

SUMMARY OF THE INVENTION

The principal object of the invention is to provide a new and improved beam splitter and launcher for a polarized light beam, incorporating a unique optical array that is simple and inexpensive in construction yet essentially immune to most ordinary vibration and shock effects, and that consistently launches the output beams through two optical fibers or other like transmission elements.

A further object of the invention is to provide a new and improved beam splitter/beam launcher in which the output beams are always aligned along essentially the same paths despite substantial variations in the orientation of the main optical array of the splitter made to change the output intensity ratio, thereby minimizing alignment problems.

Accordingly, the invention relates to a continuously variable ratio beam splitter and beam launcher for splitting an input light beam into first and second output light beams and launching those output beams through first and second light transmission elements; the beam splitter/launcher comprises a frame, an optical support adjustably mounted on the frame, and beam splitting optical array means, mounted on the optical support and interposed in the path of an input light beam, for splitting the input beam into first and second output beams launched along first and second output paths, respectively, each output path having a fixed position and alignment relative to the frame regardless of adjustments of the optical support within a given limited adjustment range. Intensity ratio adjustment means are connected to the base and to the optical support, for adjusting the alignment of the support relative to the input beam path, within said limited adjustment range, to vary the intensity ratio between the output beams; first and second transmission element positioners, each affixed to the frame, accurately position a pickup portion of each of first and second transmission elements in the first and second output paths, respectively.

DESCRIPTION OF THE DRAWINGS

FIG. 3 is an enlarged-scale plan view of a portion of the beam splitter launcher of FIG. 1 with a cover removed to show the rotating mechanism for the optical array;

FIG. 4 is a detail view taken approximately as indicated by line 4—4 in FIG. 3;

FIG. 5 is an enlarged-scale view of a fiber optic cable positioner taken approximately as indicated by line 5—5 in FIG. 1, with the cover removed;

FIG. 10 is a schematic view, like FIG. 2, of an optical array for another embodiment of the invention;

FIG. 11 is a plan view of a dual continuously variable beam splitter launcher utilizing two of the optical arrays of FIG. 10;

FIG. 11A is a detail sectional view, on an enlarged scale, of a part of FIG. 11;

FIG. 13 is a sectional view taken approximately along line 13—13 in FIG. 11; and FIG. 14 is a sectional view of the receptor end of a fiber optic cable used as a transmission element in the beam splitter/launcher of FIGS. 10-13.

DESCRIPTION OF THE PREFERRED EMBODIMENTS

Figure 1:
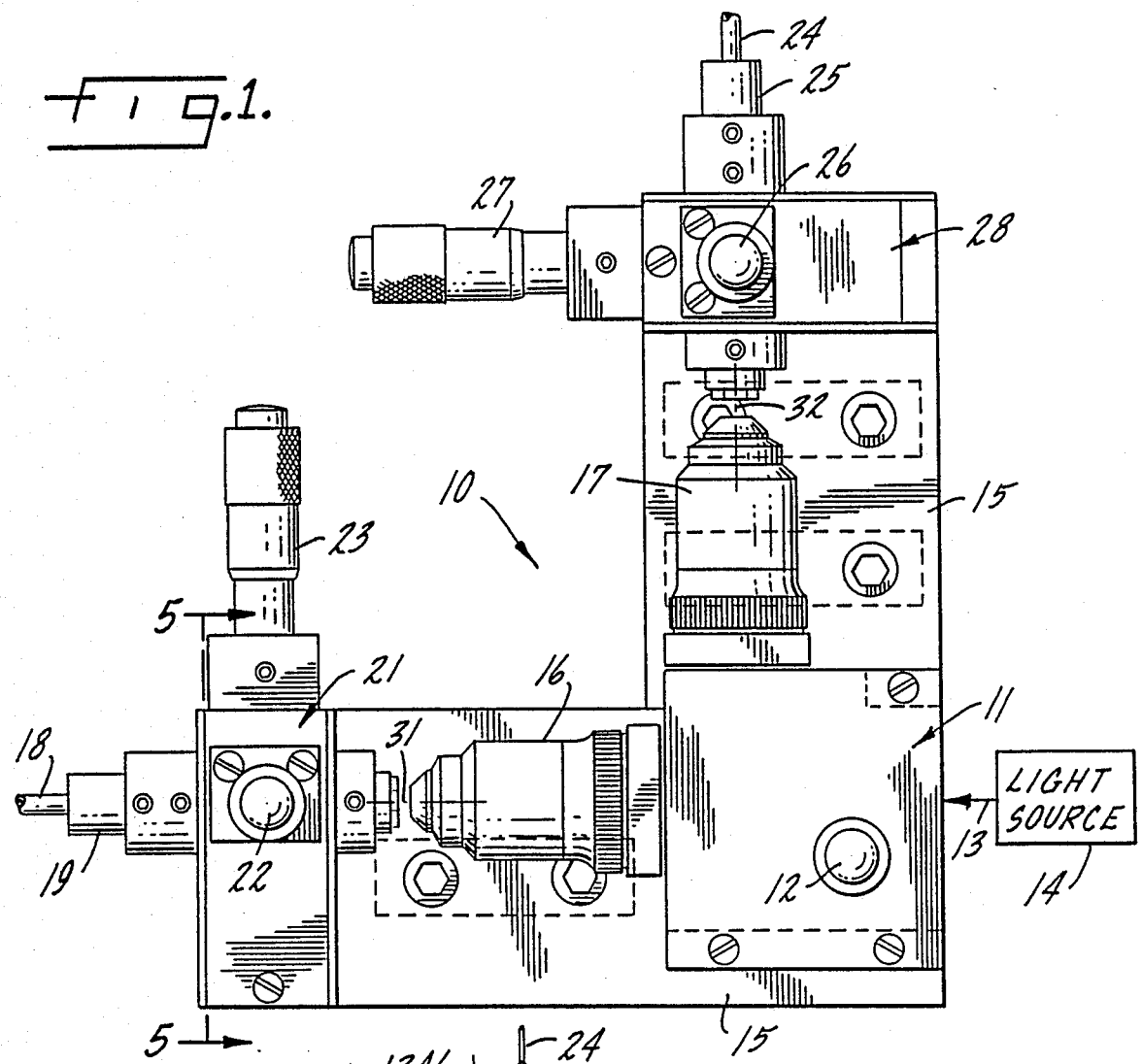
FIG. 1 is a plan view of a continuously variable ratio beam splitter and beam launcher constructed in accordance with a first embodiment of the invention.

FIG. 1 affords a plan view of a continuously variable ratio beam splitter and beam launcher 10, constructed in accordance with one embodiment of the invention, for dividing an input polarized light beam into two polarized output beams. Device 10 comprises an optical apparatus 11 provided with a rotary adjustment member 12; adjustment member 12 may be a conventional micrometer screw or head. Optical apparatus 11 is mounted on a frame 15. The optical apparatus receives, as an input, a coherent, polarized light beam projected along an input beam path 13 from a stationary light source 14. The light source may comprise a conventional laser.

Beam splitter 10 further comprises first and second lenses 16 and 17 mounted on frame 15 at right angles to each other. The first lens 16 is aligned approximately with the input light beam path 13, with some limited deviation to account for minor refractions in optical array 11, as better seen in FIG. 2. One end of an optical fiber cable 18 mounted in a cable holder 19 that projects through a transmission element positioner 21 and is aligned with the focal point of lens 16. Positioner 21 includes two coordinate position adjustment members 22 and 23; members 22 and 23 are preferably micrometer heads. Similarly, an optical fiber cable 24 is aligned at the focal point of the second lens 17; cable 24 is held in a cable holder 25 extending through a positioning device 28 that incorporates two coordinate micrometer head position adjustment members 26 and 27. Optic fiber cables 18 and 24 serve as light transmission elements, transmitting two output beams from device 10 to one or more remote locations. Optic fiber cables 18 and 24 are preferably of the single mode type, of the kind sometimes known as single-mode polarization-preserving fibers. The diameter of the fiber itself may be approximately four microns or substantially less.

The general mode of operation of the beam splitter/beam launcher 10 can now be described. A coherent initial polarized light beam from source 14 enters optical apparatus 11 along path 13. In apparatus 11 that initial beam is divided into two output beams, a first beam 31 directed through lens 16 and a second beam 32 directed through lens 17. As noted, the ends of fiber optic cables 18 and 24 are located at the focal points of lenses 16 and 17, respectively. Accordingly, each optical fiber captures substantially all of its associated output beam (31 or 32). Thus, the two output beams 31 and 32 are launched from device 10, through transmission elements 18 and 24, for use at some distant location. Output beams 31 and 32 are themselves polarized, with the same polarization and waveform as input beam 13. That polarization and waveform can be preserved in the transmission elements, cables 18 and 24, with appropriate precautions. At their remote ends, therefore, cables 18 and 24 afford related polarized light outputs suitable for holography, for demonstration of interference properties, and other applications.

In many of those applications, including holography, it is desirable or necessary to vary the intensity ratio range for the two beams represented in FIG. 1 by beams 31 and 32. In beam splitter 10, this is accomplished simply by adjusting optical apparatus 11 through the use of its rotary adjustment member, the micrometer head 12. Adjustment member 12 is used to vary the relative intensities of beams 31 and 32 over a wide ratio of the total light provided by input beam 13.

Figure 2:
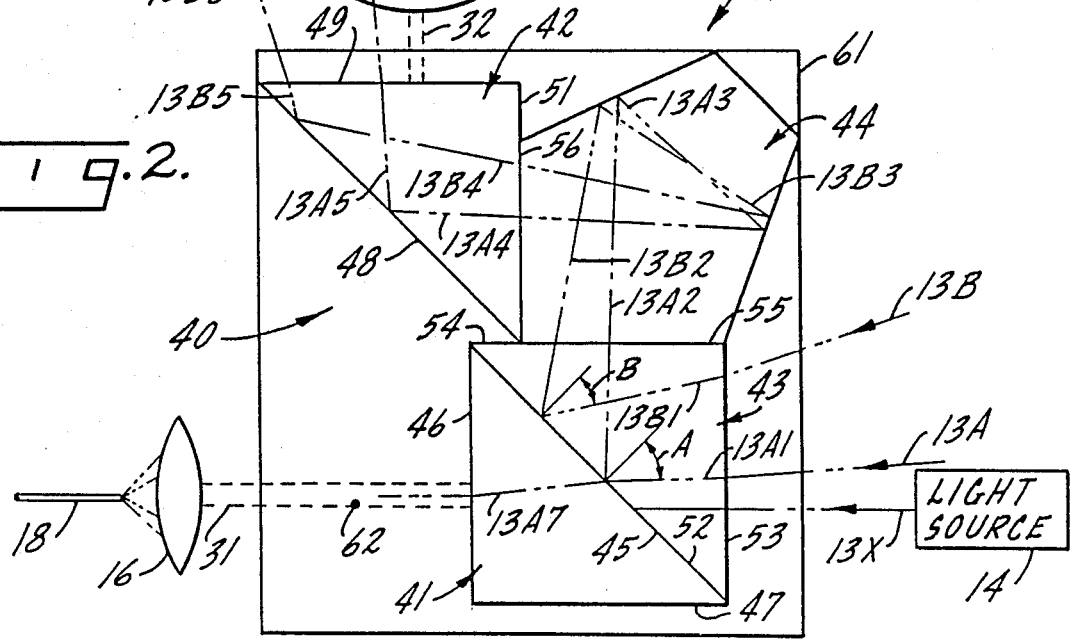
FIG. 2 is a partly schematic view, on an enlarged scale, of an optical array and auxiliary components from the device of FIG. 1.

FIG. 2 shows, in partly schematic form, the optical elements for the optical apparatus 11 in the beam splitter/beam launcher 10. Apparatus 11 incorporates an optical array 40 including first, second and third right angle prisms 41, 42 and 43, and a penta prism 44, all mounted on a rotatable optical support 61. The first right angle prism 41 has a hypotenuse surface 45 and first and second side (normal) surfaces 46 and 47. The second right angle prism 42 has a hypotenuse surface 48 and first and second side surfaces 49 and 51. The third right angle prism 43 has a hypotenuse surface 52 and first and second side surfaces 53 and 54. The penta prism 44 has first and second right angle surfaces 55 and 56 and is of conventional configuration.

In optical array 40, prism 41 is aligned with its hypotenuse surface 45 facing the hypotenuse surface 52 of the third prism 43, so that prisms 41 and 43 afford an optical divider for an input beam from source 14, on path 13X. The penta prism 44 has its first right-angle side 55 facing and engaging the second side surface 54 of prism 43. The second right angle prism 42 is aligned with the penta prism 44, with surface 51 of prism 42 facing and engaging surface 56 of prism 44 so that hypotenuse surface 48 of prism 42 projects at an angle of 45° to surface 54 of prism 43.

All of the four prisms 41-44 are mounted in fixed positions, as shown in FIG. 2, on the rotatable optical support 61; adhesive mounting may be utilized. Support 61 is rotatable about an axis 62 perpendicular to the plane of the drawing. Axis 62 is located at a point on the input light beam path, 13X in FIG. 2, beyond the prisms 41 and 43 which serve as an optical divider in array 40 as explained below.

In considering the operation of optical array 40 in apparatus 11, FIG. 2, it may first be assumed that array 40 is aligned as shown with light source 14, so that the initial or input light beam along path 13X impinges on surface 53 of prism 43, which constitutes the input surface for array 40. This is shown for purposes of illustration only; when array 40 is aligned so the input beam strikes surface 53 as indicated by line 13X the optical array 40 is not in its normal range of operation.

If support 61 is now rotated clockwise through a small angle, it may be aligned with light source 14 so that the initial input beam enters array 40 along the path 13A. As the input beam passes through surface 53 of prism 43 it is refracted slightly to the path 13A1, which impinges on the hypotenuse surface 52 of prism 43 at an angle A. Angle A is one limit for the normal operational range of array 40 (and beam splitter 10); it is the so-called critical angle for prism 43, at which total internal reflection (TIR) occurs.

In these circumstances, all of the light from the incident input beam is reflected along path 13A2 and then, in sequence, along path segments 13A3 through 13A6. But the rotation of support 61 to alignment with light input path 13A also aligns path segment 13A6 with the output beam path 32 that is parallel to and approximately coincident with the axis of lens 17. For this condition, with the input beam striking hypotenuse surface 52 of the third or input prism 43 at its critical angle A, all output is diverted to beam 32 and lens 17. If any light were to pass through surface 52 into prism 41 it would follow path 13A7, a continuation of path 13A1, and end up as beam 31, parallel to the axis of lens 16. Actually, essentially no light goes to beam 31 and lens 16. The ratio of intensity is approximately one hundred percent to beam 31, zero to beam 31.

Further clockwise rotation of support 61 about axis 62 can be effected until the light from source 14 impinges on surface 53 of prism 43 along a path 13B and continues along a segment 13B1 of that path to impinge upon hypotenuse surface 52 at an angle B. Angle B is the Brewster angle for prism 43 and defines the other limit for the normal operation of optical array 40 and beam splitter 10, with all light transmitted through the facing parallel hypotenuse surfaces 52 and 45 and out through side surface 46 of prism 41 as output beam 31. If there were any light reflected back from surface 52 it would follow the path segments 13B2 through 13B6 to beam 32; actually, virtually no light traverses this path due to the polarization of the input beam.

It is thus seen that alignment of array 40 for the input path 13B, with the input beam impinging on the hypotenuse surface 52 of prism 43 at the Brewster angle B for polarized light from source 14, defines one limit for an operating range with all light input going to the first output beam 31 and none to the second output beam 32. Rotational alignment to coincidence with path 13A defines the other limit of the operating range, with all input light going to the second output beam 32 and none to beam 31. Angular adjustment of array 40 by rotating its support 61 about axis 62 can provide any desired intensity ratio for the two component output beams 31 and 32; adjustment over the intensity ratio range is continuous. For typical prisms of optical glass, type BK-7, the Brewster angle is about 33° and the critical angle is approximately 41°; the total angular range for operation of array 40 is thus relatively small.

The two light output beams 31 and 32 do not necessarily line up precisely on the axes of lenses 16 and 17. The spread for beam 31 typically may be about 0.5 millimeters and for beam 32 about 0.3 millimeters. This causes no substantial loss of efficiency for optical apparatus 11, however, if the input ends of the optical fibers 18 and 24 are located with reasonable accuracy at the foci of their associated lenses. As long as the pivot point 62 for support 61 is accurately located on the original input beam path (extended) there is no need to adjust lenses 16 and 17 once initial alignment is achieved; the output beam paths 31 and 32 each have a fixed position and alignment relative to frame 15, and those components of device 10 fixedly mounted on the frame, regardless of adjustments of the optical support 61 within its limited normal operational range.

Prisms 41-44 should have mirror and anti-reflection coatings on various appropriate surfaces. Mirror coatings are preferably employed on prism surfaces 48 and on the exposed surfaces of penta prism 44. Anti-reflection coatings should be utilized on prism surfaces 46, 49, and 53. An index-matching adhesive is utilized between surfaces 51 and 56 and surfaces 54 and 55. Over the operating range between the impingement points of paths 13A1 and 13B1 on surface 52 there should be no contact between surfaces 45 and 52; rather, there should be a very thin air space over this range. As an example, in optical array 40 each of the three right angle prisms 41-43 may have side surfaces with lengths of 12.7 millimeters, with the penta prism having right-angle side surfaces of 10.0 mm.

FIGS. 3 and 4 show a simple but effective ratio adjustment means used to rotate the optical array 40 and thus adjust the relative intensities of beams 31 and 32. The axially movable plunger 64 of the adjustment member, micrometer head 12 (FIG. 1) engages an inclined cam surface 65 that projects from the angularly movable support 61. A spring 66 connected to cam 65 and to frame 15 biases members 65 and 61 in the direction of arrow D. As plunger 64 advances in the direction of arrow E, support 61 and array 40 are turned clockwise, due to inclined cam 65. When plunger 64 is retracted support 61 is pulled back counterclockwise by spring 66.

FIG. 5 shows a simple mechanism that may be used for positioning device 21 and also for the corresponding device 28 (FIG. 1). Device 21, as shown in FIG. 5, has a rectangular frame formed by four frame members 71-74. A fixed block 75 within the frame supports a first pair of guide members 76; members 76 are pivotable about an axis 81. Guide members 76 in turn carry a second guide member 77; pivotal movement of member 77 is permitted, about an axis 82. A spring 88 interconnects members 75 and 77. The plungers 92 and 93 of the micrometer heads 22 and 23, respectively, engage guide member 77 at right angles; spring 88 maintains guide member 77 in engagement with both plungers.

The two adjustment members, micrometer heads 22 and 23, afford a precise means for adjusting the lateral position of optical fiber 18, which extends through a tube 101 in guide member 77, into accurate alignment with the axis of lens 16 (FIG. 1) to assure gathering all of beam 31 into the fiber optic cable 18.

Figure 6:
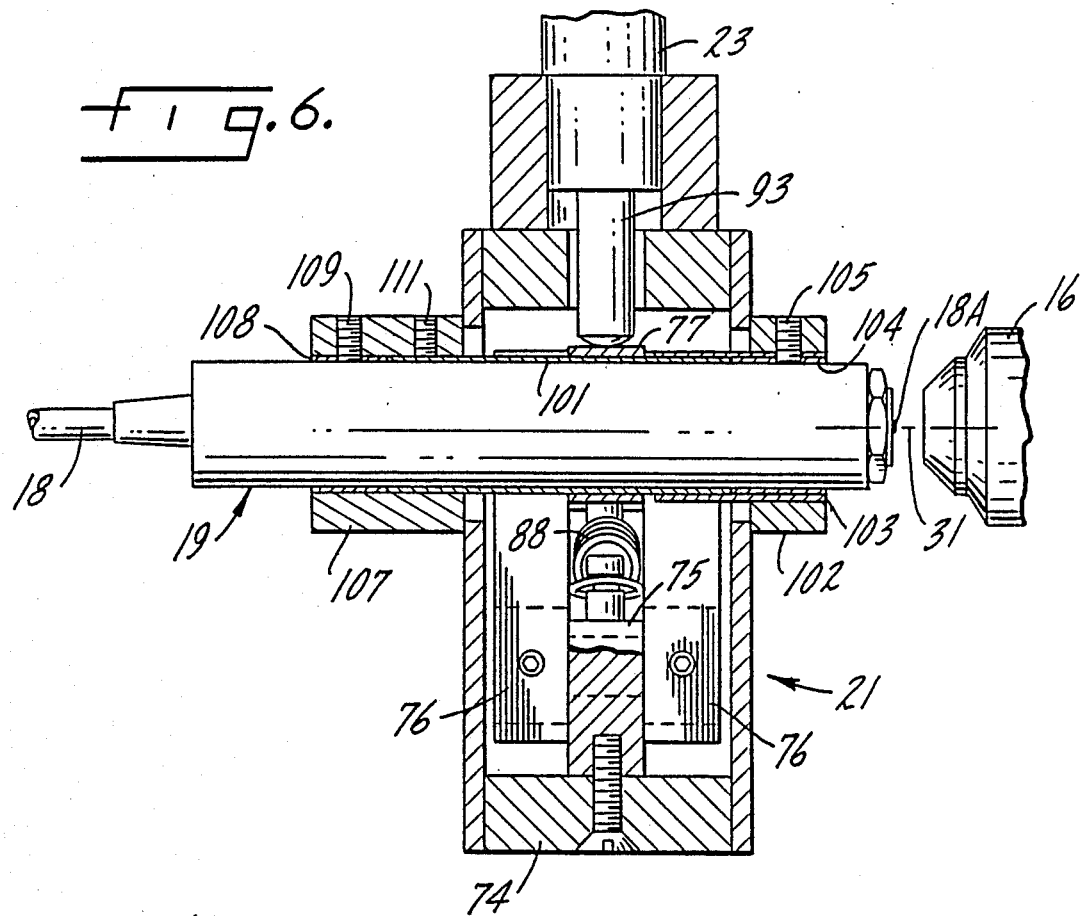
FIG. 6 is a sectional view taken approximately along line 6—6 in FIG. 5.

As shown in the sectional view of positioning device 21, FIG. 6, a brass tube 101 extends through and is affixed to guide member 77. The cylindrical cable holder 19 extends through tube 101 and also extends through a longitudinal stop comprising a collar 102 within which two concentric tubes 103 and 104 are mounted. Tube 103 is longer than tube 104. A set screw 105 extends through collar 102 and tubes 103 and 104 for engagement with cable holder 19. Collar 102 is located at the side of positioning device 21 adjacent lens 16.

At the other side of positioning device 21, there is a collar 107 within which a thin tube 108 is mounted. Tubes 108 and 104 have the same thickness as the tube 101 that is mounted in guide member 77. There are two set screws in collar 107, a first set screw 109 that extends through both the collar and tube 108 and a second set screw 111 that is aligned with a portion of the collar that does not include tube 108. The internal construction of cable holder 19 is not shown; any appropriate construction, preferably one that accepts conventional fiber termination devices, may be utilized.

In the use of cable holder 19, as shown in FIG. 6, the axial position of the cable holder is first determined. The inner end 18A of the fiber from cable 18, as previously noted, should be aligned with substantial accuracy at the focus of lens 16. A simple thickness gauge may be employed. When this has been accomplished, set screws 105 and 109 are tightened. This precludes further axial movement of cable holder 19 and assures location of fiber optic end 18A at the desired spacing from lens 16. It is then a simple matter to align the cable laterally with the axis of the lens, using the two micrometer head positioning members 22 and 23 (FIGS. 5 and 6).

The angular position of cable holder 19 may also be of some importance, particularly since polarization-retaining fibers typically carry polarized light oriented along a specific axis of the optical fiber. Thus, the polarized light must be launched into the optical fiber aligned with the axis of propagation. This can be accomplished simply by loosening set screw 111, which permits rotation of cable holder 19 without requiring for axial movement. The set screw 111 is then tightened. Orientation and alignment may thus be maintained.

Beam splitter 10 is far less susceptible to disturbance by external vibration than conventional beam-dividing devices. If beam splitter 10 and its light source 14 are firmly mounted on a common base, most external disturbances have no discernible effect on operation of the beam splitter. As compared to other comparable mechanisms, beam splitter 10 is simple and inexpensive in construction yet highly reliable and precise in operation.

Prisms 41 and 43 conjointly afford an optical divider means that performs the basic task of dividing the input beam 13 into first and second intermediate beams having intensities dependent on the alignment of the prism surface 53 with the beam input path, over the range from path 13A to path 13B. A device of this kind, known as a "beam splitting cube", is commercially available. Another device that can be used as the initial optical divider, instead of prisms 41,43, is an interference filter; several varieties of interference filter are known.

Figures 7, 8:
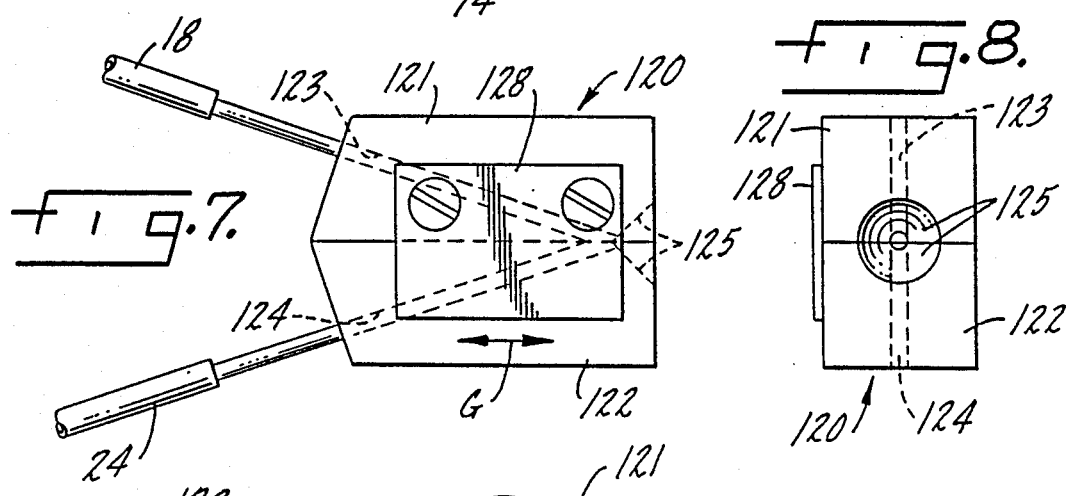
FIGS. 7 and 8 are enlarged elevation views of a demonstration device formed by simple attachments to the distal ends of fiber optic cables fed by the beam splitter of FIG. 1.
Figure 9:
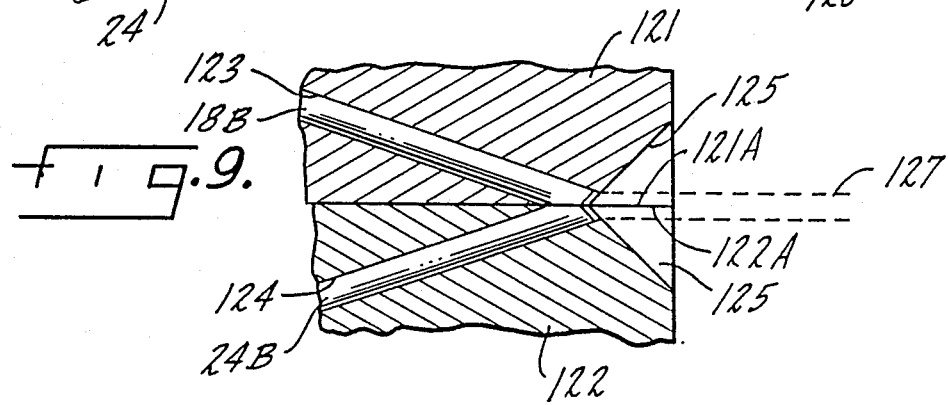
FIG. 9 is a greatly enlarged sectional view of the device of FIGS. 6 and 7.

FIGS. 7, 8 and 9 illustrate a demonstration device 120 afforded by two simple attachments 121 and 122 on the distal ends of the fiber optic cables 18 and 24. Device 121 is a simple metal block through which a small hole 123 has been drilled at an acute angle, substantially smaller than 45°. Attachment 122 is of similar construction, comprising a metal block through which a small angularly oriented hole 124 extends. The holes 123 and 124 are at matched angles in the two metal blocks 121 and 122 and terminate at a recess 125 formed in both blocks and affording a continuous recess when the blocks are disposed in alignment with each other as shown in the drawings. The optical fiber from cable 18 extends through hole 123 in block 121; similarly, the optical fiber from cable 24 extends through the hole 124 in block 122. The holes 123 and 124 may be of such character as to allow for a slip fit of the terminating ferrules of fibers 18 and 24. The terminating ferrules of fibers 18 and 24 may be held in place by individual set screws (not shown).

As shown in the enlarged detail view of FIG. 9, the inner ends 18B and 24B of the two optical fibers are ground and polished to coincide with the mating surfaces 121A and 122A of blocks 121 and 122. With the two blocks 121 and 122 accurately aligned as shown in the drawings, and with the angular relation of the tip ends of the optical fibers properly selected, light emerging from optical fiber tip 18B is refracted parallel to surface 121A and light emerging from optical fiber tip 24B is parallel to surface 122A. Since when surfaces 121A and 122A are placed together they are parallel, the light emerging from fibers 18 and 24 is also parallel. Being in very close proximity, with identical waveforms and frequencies, the light emerging from fiber tips 18B and 20B will interfere. If the two blocks 121,122 are displaced laterally relative to each other as indicated by arrows G in FIG. 7, the light beam emerging from the fiber optics 18B and 24B may adjusted to change the interference pattern. By directing beam 127 against a blank wall or a screen, demonstration of interference properties of monochromatic light beams is readily effected. To aid in guiding the movements of attachments 121 and 122 relative to each other, one or more side guide plates 128 may be affixed to the attachments to assure maintenance of accurate lateral alignment for the fiber optics.

FIG. 10 illustrates, in somewhat schematic form, the optical elements for a variable ratio beam splitter/beam launcher comprising a further embodiment of the invention. The apparatus of FIG. 10 incorporates an optical array 240 that includes a right-angle prism 242 and a penta prism 244 mounted upon a rotatable support 261 along with an optical divider 241. Optical divider 241 comprises two optical elements 245 and 246 joined together along a common surface 47. Optical element 245 is aligned with the hypotenuse surface 248 of the right angle prism 242. One right-angle surface 249 of prism 242 faces toward a fiber optic cable 224. The other right angle surface 251 of prism 249 is disposed in intimate contact with and secured by optically matching adhesive to one right angle surface 256 of penta prism 244.

Optical array 240 is aligned with a light source 214 that projects a polarized beam of light along an input beam path 213. Support 261 for optical array 240 is pivotally mounted for rotation about an axis 262 that is located on an extension of beam path 213 projecting beyond optical divider 241.

In considering the operation of the variable ratio beam splitter and launcher of FIG. 10, it may be assumed that support 261 and optical array 240 are aligned in the position shown, with the input light beam on path 213 impinging upon divider 241 at a given angle P. The input light beam continues on into optical divider 241 along a path 213P1. A part of the light beam is reflected from surface 247 and emerges from divider 241 along a path 213P2 that is approximately normal to the lower right angle surface 255 of penta prism 244. In prism 244 this portion of the light beam is reflected onto a path 213P3 and then again onto another path 213P4 which passes through the surfaces 251 and 256 into prism 242. At surface 248 of prism 242, this portion of the beam is again reflected and emerges from the prism along an output path 213P6 that impinges upon the end of a fiber optic cable 224.

Referring again to the beam divider 241, a portion of the input beam continues along path 213P1 through the interface 247 and emerges from the optical divider along an output beam path 213P7. Path 213P7 terminates at the end of an optical fiber cable 218.

Rotation of support 261 in a clockwise direction about its pivotal axis 262 is effective to bring a beam path 213Q into alignment with the input beam path 213 from light source 214. When this is done, the input light beam, as divided by divider 241, reflects a portion of the light through penta prism 244, along the paths 213Q2, 213Q3, and 213Q4. The beam emerges from prism 242 along an output path 213Q6, which is now aligned with the end of fiber optic cable 224. For these same conditions with respect to angular orientation of optical support 261, another fraction of the input beam entering along path 213Q follows path 213Q1 through divider 241 and emerges along output path 213Q7, now aligned with the receptor (input) end of fiber optic cable 218. Of course, there is an essentially infinite number of intermediate angular orientations as generally indicated by the input beam path 213R. For each path alignment between path 213 and path 213Q, the output intensity ratio for output beams 231 and 232 is different.

From the foregoing description it will be seen that alignment of optical array 240 with the initial input path 213 from light source 214, with the beam impinging upon the optical divider 241 at angle P, defines one limit for an operating range. At angle P, most of the light is directed to the output path 232 which is aligned with optical fiber 224. Virtually none of the light goes to the output beam 231 that is aligned with fiber optic cable 218. At the opposite extreme, with divider 241 aligned to the input path 213Q at angle Q, essentially none of the input light beam is diverted to the output beam 232 that is launched into the receptor end of fiber optic cable 224. In this situation, most of the light goes to the output beam 231 supplying fiber optic cable 218.

FIG. 11 affords a plan view of a continuously variable ratio beam splitter/launcher 210 mounted on a frame 215 and including an optical apparatus 211, shown with the top 201 of a cover 202 cut away to disclose two optical arrays 240 and 340. Optical arrays 240 and 340 are mounted on supports 261 and 361, respectively. Support 261 is pivotally mounted on a base plate 209, a part of frame 215, by means of a pivot pin 204 that is press fit into the support. Pin 204 is centered on the axis 262 (see FIG. 10), and its top end 204A is ground to a spherical configuration (FIG. 11A), thus affording minimum (point) contact between pin 204 and an L-shaped leaf spring 205. Spring 205 is mounted on base plate 209 by an elongated retainer post or screw 206, and assures retention of support 261 on pin 204. The hold-down pressure afforded to pin 204 by leaf spring 205 is adjusted and held constant by adjustment of screw 206, thus affording a simple assembly method, a simple adjustment method and a simple retention method without material friction loading. A similar mounting arrangement, comprising a pivot pin 304 having a spherical top, a leaf spring 305, and a retainer post 306, is used to mount the support 361 for optical array 340 on base plate 209.

A ramp or inclined cam member 265 is an integral part of support member 261, FIG. 11. Cam 265 is engaged by an axially movable adjustment screw 264 that replaces the plunger 64 of the micrometer head 12 in the prior embodiment (see FIGS. 3 and 4). The adjustment screw 264, FIGS. 11 and 12, can be threaded into the top 201 of cover 202. A spring 266 connected between a pin 203 projecting from base plate 215 and another pin 207 mounted on support 261 (FIG. 11) completes the angular adjustment mechanism for optical array 240. The angular adjustment works in the same manner as previously described for FIGS. 3 and 4. For optical array 340, an inclined cam member 365 that is a part of the pivotal support 361 is engaged by a vertically adjustable screw 364. This arrangement, in conjunction with a spring 366 between two pins 303 and 307, provides the same simple, accurate, and effective means for shifting the angular alignment of optical array 340 to vary the intensity ratio of its output beams 331 and 332.

Optical array 240 in FIG. 11 is the same as shown in FIG. 10; it includes the angle-responsive beam divider 241 and prisms 242 and 244. Divider 241 as shown is an interference filter, but it may be a dual prism construction as shown in FIG. 2 or a commercially available thin-film beam splitting cube. An input beam on path 213, from a laser or other appropriate source 214, is split into two output beams 231 and 232 as previously described. The intensity ratio of beams 231 and 232 is adjusted by utilizing adjustment screw 264 working against inclined cam 265, in conjunction with spring 266, to control the angular orientation of array 240, and particularly divider 241, within a given limited adjustment range, relative to the input beam path 213.

Optical array 340, on its adjustable support 361, is a duplicate of array 240. It includes the input beam divider 341, which may be a commercially available beam splitting cube, a dual prism construction like the divider 41,43 of FIG. 2, an interference filter, or any other device that varies the intensity of two output beams responsive to changes in its alignment with an input beam. In this instance the input beam impinging on divider 341 is the second output beam 232 from optical array 240.

Optical array 340, FIG. 11, further comprises a penta prism 344 and a right-angle prism 342; prisms 342 and 344 are fixedly aligned with each other and with divider 341, on an adjustable support 361, as in the previously described embodiments (FIGS. 2 and 10). Array 340 is mounted on the support 361; a pivot pin 304 is press fit into the support and rotatably mounted in base 209. Pin 304 has a spherical top engaged by an L-shaped leaf spring 305 affixed to base 209 by a screw 306. A first output beam 331 from optical array 340 is derived directly from divider 341. A second output beam 332 is projected from the output prism 342. As before, the intensity ratio between beams 331 and 332 is determined by the angular alignment of array 340 relative to its input beam 232. That alignment is adjusted as desired by use of screw 364 and cam 365, together with return spring 366.

In the embodiments of FIGS. 10 and 11, penta prisms 244 and 344 should have mirror coatings on appropriate surfaces and all surfaces where light enters or exits at a glass-air interface should be anti-reflection coated. An index-matching adhesive is preferably used between mating surfaces of the prisms.

Operation of the optical arrays 240 and 340 in the beam splitter/launcher 210 of FIG. 11 is as described for FIG. 10, except that an input beam on path 213 from source 214 may be split twice instead of just once. Thus, the initial beam split occurs in optical array 240, based on its angular alignment relative to input beam path 213. This determines the division of the available light between beams 231 and 232. In optical array 340 beam 232 is again split, into two output beams 331 and 332, with the intensity ratio determined by the angular orientation of array 340 to its input beam 232. Virtually any desired intensity ratio between the output beams 231, 331 and 332 can be established by appropriate adjustment of the alignments of optical arrays 240 and 340, with only minimal overall losses in beam splitter/beam launcher 210. The beam splitter and launcher is essentially immune to ordinary vibration (e.g., from machinery operating nearby, personnel or equipment passing on relatively resilient floors, etc.).

Figure 12:
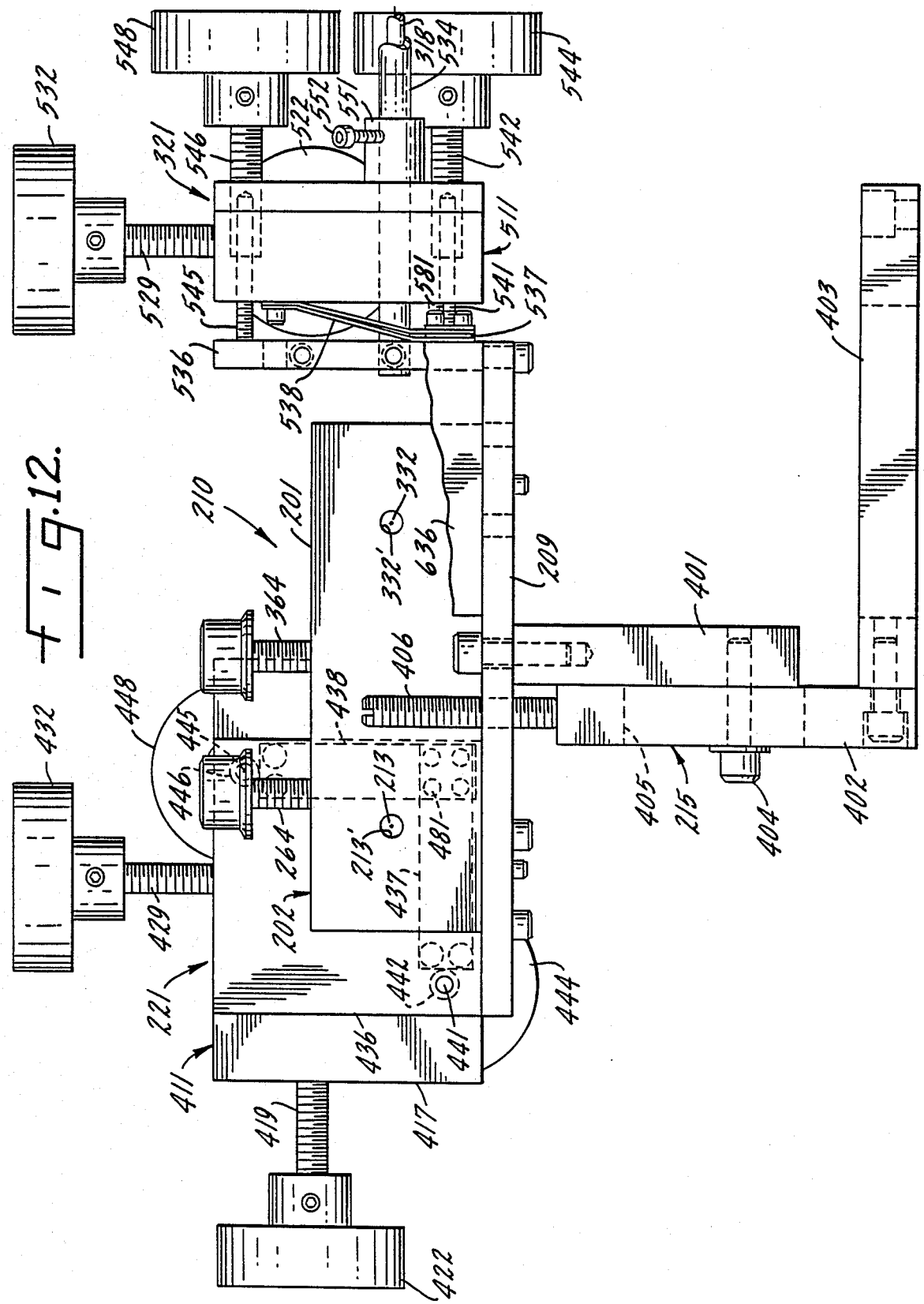
FIG. 12 is an elevation view, partially cut away, taken approximately along line 12—12 in FIG. 11.

Frame 215 of beam splitter and launcher 210, in addition to base plate 209, includes two vertical support plates 401 and 402 (FIG. 12). Plate 401 is securely affixed to plate 209 and plate 402 is affixed to and projects upwardly from a bottom plate 403. The bottom plate 403 may be bolted or otherwise mounted on a desk, worktable, or other reasonably stable surface. A plurality of clamp bolts 404 extending through slots 405 in plate 402 and threaded into plate 401 join frame members 401 and 402; the vertical position of plate 401, and hence of base plate 209, is readily adjusted by means of a pair of height adjustment screws 406 (FIGS. 11 and 12) threaded through base plate 209 and engaging the top of vertical plate 402.

The input light beam enters housing 202 of beam splitter/launcher 210 along path 213, from source 214, through a small aperture 213', FIGS. 11 and 12. Aperture 213', of course, is aligned with the external light source 214. Output beams may emerge through any or all of three apertures 231', 331' or 332' in housing 202. Positioners 221, 321 and 328 (FIG. 11) are used to align and position the three fiber optic light transmission elements 218, 318 and 324 with the output beams emerging from apertures 231', 331' and 332', respectively.

Th positioner 221 for light transmission element (fiber optic cable) 218 is illustrated in FIGS. 11–13; positioner 221 is also representative of the other two positioners 321 and 328 for fiber optic cables 318 and 324. Positioner 321 comprises a housing 411, preferably a metal casting, enclosing a chamber 412 (FIG. 13) covered on one side by a plate 413. An outer support member 414 is mounted in chamber 412 by two leaf springs 415. One end of each of springs 415 is affixed to support member 414, and the other ends of the springs are affixed to housing 411, which limits the movement of support member 414 to one plane only.

A rod 416 having a high-pitch external thread is affixed to member 414 and projects toward one end wall 417 of housing 411. The external thread on rod 416 is engaged in a threaded socket 418 in another rod 419 that has an external thread of lower pitch; rod 419 extends through and is threaded into an internally threaded aperture 421 in housing wall 417. An X-axis adjustment knob 422 is affixed to rod 419.

An inner support member 424 is supported in chamber 412 by two leaf springs 425, each are affixed at one end to inner support member 424 and at the other end to an arm 423 of outer support member 414 which limits the movement of inner support member 424 to one plane only. The individual movements of supports 414 and 424 are in the same plane, being limited to that plane by leaf springs 415 and 425, but are approximately 90° to each other. However, the motion of outer support member 414 also moves inner support member 424 in the same plane due to the attachment of inner support member 424 to outer support member 414. A rod 426 having a high-pitch external thread is affixed to inner support member 424, projecting into an internally threaded aperture 431 in block 414; aperture 431 is substantially larger than rod 426. Aperture 431 receives another, larger rod 429 having an external thread, matching that of the aperture, that is of appreciably lower pitch than the thread on rod 426. Rod 429 has an internally threaded socket 428 into which rod 426 is threaded. A Y-axis adjustment knob 432 is affixed to the outer end of rod 429. An aperture through member 424 receives a cable holder sleeve 434, encompassing a lens 435 for output cable 218 (see FIG. 13) as explained more fully hereinafter.

The mounting of positioner 221 includes pitch and yaw adjustments to supplement the X and Y axis adjustments afforded by knobs 422 and 432. As shown in FIGS. 11 and 12, a vertical frame member comprising a plate 436 is securely mounted on and projects upwardly from base plate 209. Two leaf springs, a horizontal (yaw) spring 437 and a vertical (pitch) spring 438, are affixed to the lower right-hand corner of plate 436, as seen in FIG. 12; the free end of each of the springs 437 and 438 engages and presses outwardly against positioner housing 411. This relationship is perhaps better shown by the corresponding leaf springs 537 (yaw) and 538 (pitch) mounted on the vertical frame member 536 for the positioner 321, engaging its housing 511; see FIG. 12.

A rod 441 having a high-pitch external thread is fixedly mounted on vertical frame member 436 and projects into housing 411 of positioner 221 (FIG. 11). A larger diameter rod 442 having an external thread of a lower pitch is threaded into an aperture 443 in the cover 413 of housing 411 and a yaw adjustment knob 444 is mounted on the external end of rod 442. The high-pitch thread on the smaller rod 441 is received in a threaded socket in the larger rod 442, as in the previously described adjustment mechanisms for the X and Y axes; see FIGS. 11–13.

The pitch adjustment for positioner 221 essentially duplicates the yaw mechanism. A small diameter rod 445 having a high-pitch exterior thread, affixed to vertical frame member 436, extends into the housing of positioner 221 and into a threaded axial aperture in a larger diameter rod 446. Rod 446 has a lower-pitch external thread engaged in a threaded aperture 447 in cover 413 of housing 411. A pitch adjustment knob 448 is mounted on the outer end of rod 446. Leaf springs 437 and 438 effectively confine yaw and pitch adjustment movements of positioner 221 to a predetermined yaw adjustment plane and a predetermined pitch adjustment plane, respectively.

A further elements of the pitch and yaw adjustment mechanism is a post or threaded rod 481 of nylon or other slightly flexible material affixed securely at one end to vertical plate 436, at approximately the point where leaf springs 437 and 438 are also attached. The other end of rod 481 is affixed to positioner housing 411.

The presence of post 481 adds stability and a fixed rotation point for both pitch and yaw adjustments. The location of post 481 (and the attachment points for leaf springs 437 and 438) should be as close as possible to the optical fiber axis to provide for the least difficult adjustments of pitch, yaw, X axis, and Y axis.

There is one more adjustment mechanism in positioner 221, a Z axis adjustment. As noted above, fiber optic cable 218, in a sleeve or holder 434, passes through positioner housing 411. A collar 451 projecting out through cover 413 (FIGS. 11,13) and rigidly attached to inner support 424, receives holder 434. Collar 451 provides a means to allow an external clamping point for holder 434, provides stability to holder 434, and carries the combined motions of inner support 424 and outer support 414 to holder 434. Collar 451 also provides for rotation of holder 434; holder 434 is held rigid in the collar by set screw 452. Holder 434 also extends into an aperture 453 in frame member 436. The lens 435 at the end of fiber optic cable 218 is preferably positioned just beyond the surface of frame member 436 facing optical housing 202. Holder 434 is secured in collar 451 by the set screw 452; Z axis adjustment, which is not unduly critical, is accomplished with the set screw.

The other fiber optic cable positioners 321 and 328, as previously noted, preferably have the same construction as positioner 221. Thus, positioner 321 for optical fiber cable 318 includes a main housing 511 and is mounted on a vertical frame member 536 by means of the springs 537 and 538 together with a yaw adjustment mechanism 541,542,544 and a pitch adjustment mechanism 545,546,548. X axis adjustment is afforded by a knob 522 operating a rod 518; Y axis adjustment is provided by a knob 532 operating on rod 529. Z axis adjustments as before, are afforded by a set screw 552 on a collar 551 encompassing a holder sleeve 534 on the end of fiber optic cable 318. Positioner 328, similarly, comprises a housing 611 mounted on a vertical frame member 636 in the same manner as described for positioners 221 and 321. Positioner 328 has an X axis adjustment knob 622, a Y axis adjustment member 632, yaw and pitch adjustment knobs 644 and 648, and a Z axis set screw adjustment 652 in a collar 651.

Referring to FIG. 13, is it seen that threaded rods 416 and 419, in the illustrated construction, afford a compound differential screw in which a substantial rotary displacement of knob 422 on rod results in a much smaller axial displacement of rod 416 and its guide member/support block 414 than would be the case with a simple adjustment screw with an external thread. For example, the larger or primary adjustment rod 419 may have a diameter of one-fourth inch and an outer thread with a pitch of twenty-eight threads per inch, whereas the thread on the smaller secondary rod 416 may have a pitch of thirty-two threads/inch, with a size corresponding to No. 6 wire gauge. This affords a substantial mechanical advantage; that is, with these relationships an axial movement of one inch for knob 422 results in a displacement of guide member 414 (FIG. 13) of only one-eighth inch. The 8:1 mechanical advantage allows for precise, accurate X axis positioning. All of the other differential screws in positioner 221, and in positioners 321 and 328, may have the same ratios, affording the same mechanical advantage and the same accuracy of positioning in each instance, with the added advantage of virtually complete duplication and interchangeability of parts.

FIG. 14 shows a preferred construction for the input or reception end of the fiber optic cable 218, a construction also applicable to the receptor ends of cables 318 and 324. As shown, the receptor end 718 of cable 218 (the actual fiber optic is represented by line 719) includes cable holder sleeve 434. A description of the manner in which receptor end 718 of fiber optic cable 218 is assembled will afford the best description of its construction.

Initially, optical fiber 719 is inserted into a ferrule 721, with a portion of the sheath 720 of cable 218 extending into the ferrule. Ferrule 721 is a length of brass tubing having a very small axial opening to receive fiber 719, with a small cup-like depression at the end of the ferrule opposite cable sheath 720. The cup-like depression in ferrule 721 leads into a short enlarged length of the axial opening. A fiber guide 722 is inserted over the end of fiber 719 and seated in the enlarged portion of the axial opening in ferrule 721. Guide 722 may be a length of stainless steel hypodermic needle stock. Guide 722 is recessed about 0.02 to 0.03 inch, in the cup-like depression in the end of ferrule 721, which is now filled with epoxy resin 723. The resulting assembly is then heated to cure the resin.

After the epoxy resin 723 is cured, the resin and the end of optical fiber 719 are ground and polished flat, perpendicular to the axis of fiber 719 and 721. The resin affords a stable base for the fiber for this operation. Lens 435 is then aligned with the exposed, polished end of fiber 719 located approximately at the focal point of the lens. If possible, lens 435 should be selected to have approximately the same numerical aperture as fiber 719, for maximum efficiency. If receptor 718 is at the output end for cable 218, such a numerical aperture match results in an approximately collimated beam output. An optical matching adhesive 724 is then deposited in the gap between the end of lens 435 and the end of optical fiber 719, and the lens position is adjusted to assure accurate focusing of the lens on the optical fiber. The refractive index of adhesive 724 is preferably near the average index of fiber 719 and lens 435.

With the lens held in place, a brass or aluminum sleeve 725 is slid over lens 435 and ferrule 721 and secured in place with a fast curing epoxy resin 726, firmly securing ferrule 721, lens 435, and optical fiber 719 in place relative to each other. Matching adhesive 724 is then cured, using ultra violet light. The resulting fiber/lens assembly is then coated with additional fast curing epoxy resin 726 and inserted into the outer sleeve or holder 434. A metal lens tip protection sleeve 727 is inserted into the end of holder 434, and is secured in place with the fast curing resin 726, and a cylindrical, flexible plastic tip is mounted on the outer end of sleeve 727.

Lens 435 is preferably of the type known as a "gradient-index lens"; a rod lens of this type combines refraction at its planar end surfaces with continuous refraction within the rod. In the preferred construction, lens 435 has a pitch of 0.25 or slight less at the wavelength of the light beam processed in beam splitter/beam launcher 210. The other fiber optic cables 318 and 324 are provided with lens/holder structures as shown in FIG. 14.

Turning now to adjustment of beam splitter/launcher 210 for operation, it is assumed at the outset that the laser or other light source 214 is accurately aligned with device 210 so that light beam 213 enters opening 213' in wall 202 of housing 201 (FIGS. 11,12) and impinges upon beam divider 241 in optical array 240. Support 261 may be rotated to produce a perceptible output beam 231 through aperture 231'. At this juncture positioner 221 is adjusted to obtain maximum output from the light transmission element, fiber optic cable 218. Cable 218 has previously been inserted to the approximate desired location along the Z axis as previously stated, with its axis of maximum propagation aligned with the plane of polarization of the laser light source 214. This may require adjustments, usually quite limited, of any or all of the X axis mechanism controlled by knob 422, the Y axis adjustment of knob 432, the yaw mechanism of knob 444, and the pitch adjustment, knob 448. If Z axis or rotational correction is found necessary (usually, it is not) this can be accomplished by use of set screw 452.

Next comes adjustment of positioner 321 for fiber optic cable 318. For this purpose, optical supports 261 and 361 are adjusted to afford a readily perceptible output beam 331 through aperture 331' in housing 201 (FIG. 11), impinging on the input end of the lens in the end of the holder for the reception end of optic fiber 318. The X axis, Y axis, yaw and pitch adjustments are made, using knobs 522, 532, 544 and 548 of positioner 321, just as with positioner 221 and cable 218, to obtain maximum output from fiber optic cable 318. Finally, positioner 328 is adjusted in the same way, using its knobs 622, 632, 644 and 648.

Once the transmission element positioners 221, 321 and 328 have been aligned, as described, a process that usually requires only a short time, usually less than thirty minutes, the beam splitter/launcher 210 is ready for operation over a long time span and for a wide variety of intensity ratios for its output beams 231, 331 and 332 without further positioner adjustments.

Virtually any set of intensity ratios is readily achieved in device 210. Thus, the two intensity ratio adjustment means comprising optical supports 261 and 361 and their cams 265 and 365 and screws 264 and 364 can be realigned, as desired, to produce intensity ratios for beams 231, 331 and 332 such as 30:30:10, 25:25:50, within the limits of the capability of the beamsplitter devices 241 and 341 to pass and reflect light. Moreover, any intensity ratio change is effected simply by adjustment of the alignments of optical supports 261 and 361 to their input beams 213 and 232; no other realignment or other readjustment is required.

In device 210, FIGS. 10–13, positioners 221, 321 and 328 play an important role as regards overall performance of the beam splitter/launcher. They afford positive action in both directions of travel for their complete combination of X and Y axis and pitch and yaw adjustments. Their differential screw adjustments, each affording a substantial mechanical advantage, allow for accurate positioning with minimum effort and minimum tendency toward dislocation due to vibration or ordinary shock effects. The spring mounts for the positioners effectively provide zero friction suspensions for them.

The fiber optic cable chucks and integral lenses used in device 210 (FIGS. 14 and 14A) are also quite advantageous. The Z axis setting, is not critical and is only for ease of alignment of the X, Y, pitch and yaw axes. The really critical Z axis alignment, e.g. the location of the polished input end of optical fiber 719 in relation to the rear focal point of lens 435, has been precisely and permanently affixed in sleeve 434. Location of the fiber optic receptor end in the output beam path is easily accomplished. Overall, the beam splitter/beam launcher devices of the invention each afford an integrated system for dividing a beam, on an intensity basis, in any desired ratio, continuously adjustable over a broad ratio range. In achieving this, the beam splitter optics, the fiber optic positioners, and the fiber optic all contribute to the end result. And the substantial immunity of the system to external vibration/shock forces, with its fixed orientation for the output beams, is a major factor in its overall value.

I claim:

1. A continuously variable ratio beam splitter and beam launcher for splitting an input light beam into first and second output light beams and launching those output beams through first and second light transmission elements, comprising:
a frame;
an optical support, adjustably mounted on the frame;
beam splitting optical array means, mounted on the optical support and interposed in the path of an input light beam, for splitting the input beam into first and second output beams launched along first and second output paths, respectively, each output path having a fixed position and alignment relative to the frame regardless of adjustments of the optical support within a given limited adjustment range;
intensity ration adjustment means, connected to the base and to the optical support, for adjusting the alignment of the support relative to the input beam path, within said limited adjustment range, to vary the intensity ratio between the output beams;
and first and second transmission element positioners, each affixed to the frame, for accurately positioning a pickup portion of each of first and second transmission elements in the first and second output paths, respectively.

2. A continuously variable ratio beam splitter/beam launcher according to claim 1, in which:
the optical array means includes an optical divider means in the input beam path;
the angular alignment of the optical divider means relative to the input beam path determines the relative division of light between the two output beams; and
the ratio adjustment means rotates the optical support to adjust the angle of incidence of the input beam path relative to the optical divider means.

3. A continuously variable ratio beam splitter/beam launcher according to claim 2 in which the ratio adjustment means rotates the optical support about an axis located at a point on an extension of the input beam path beyond the optical divider means.

4. A continuously variable ratio beam splitter/beam launcher according to claim 3 in which the optical divider means is a beam splitter cube.

5. A continuously variable ratio beam splitter/beam launcher according to claim 3 in which the optical divider means is two right angle prism aligned with their hypotenuse surfaces opposite each other.

6. A continuously variable ratio beam splitter/beam launcher according to claim 3 in which the two output beam paths are aligned approximately at right angles to each other.

7. A continuously variable ratio beam splitter/beam launcher according to claim 1 and further comprising:
first lens means, aligned with the first output path, for focusing the first output beam on the pickup portion of a first transmission element; and
second lens means, aligned with the second output path, for focusing the second output beam on the pickup portion of a second transmission element.

8. A variable ratio beam splitter/beam launcher according to claim 7 in which:
the first transmission element is a first fiber optic cable having one end mounted at the focal point for the first lens means, facing toward that lens means; and
the second transmission element is a second fiber optic cable having one end mounted at the focal point for the second lens means, facing toward that lens means.

9. A continuously variable ratio beam splitter/beam launcher according to claim 8 in which the ratio adjustment means rotates the optical support about an axis of rotation located at a point on an extension of the input beam path beyond the optical divider means.

10. A continuously variable ratio beam splitter/beam launcher according to claim 9 in which the ratio adjustment means further comprises:
a pivot pin, affixed to the optical support and having an axis corresponding to the axis of rotation, the pin projecting into a socket in the frame and also projecting above the support;
a leaf spring engaging the pin to hold the pin and support in alignment on the frame;
and an adjustment screw mounting the leaf spring on the frame.

11. A continuously variable ratio beam splitter/beam launcher according to claim 10 in which engagement between the pivot pin and the leaf spring is limited to a point contact.

12. A continuously variable ratio beam splitter/beam launcher according to claim 1, in which:
the first transmission element comprises a first fiber optic cable having one end mounted in the first positioner in the path of the first output beam, facing toward the optical array; and
the second transmission element comprises a second fiber optic cable having one end mounted in the second positioner in the path of the second output beam, facing toward the optical array.

13. A continuously variable ratio beam splitter/beam launcher according to claim 12 in which a gradient index lens is mounted in the end of each fiber optic cable facing toward the optical array.

14. A continuously variable ratio beam splitter/beam launcher according to claim 12 in which each positioner provides separate adjustments for:
X axis alignment;
Y axis alignment;
yaw alignment;
pitch alignment;
Z axis alignment; and
rotational alignment.

15. A continuously variable ratio beam splitter/beam launcher according to claim 14 in which leaf springs in each positioner limit X axis and Y axis alignment movements to movements in a single X-Y plane.

16. A continuously variable ratio beam splitter/beam launcher according to claim 14 in which:
each positioner is mounted to one location on the frame by two angularly displaced leaf springs which project away from that location at approximately 90° to each other,
and the leaf springs confine yaw alignment movements and pitch alignment movements to a predetermined yaw alignment plane and a predetermined pitch alignment plane, respectively.

17. A continuously variable ratio beam splitter/beam launcher according to claim 16 in which leaf springs in each positioner limit X axis and Y axis alignment movements to movements in a single X-Y plane.

18. A continuously variable ratio beam splitter/beam launcher according to claim 14 in which:
X and Y axis alignment movements are confined to a common X-Y plane;
Z axis alignment movements are at 90° to the X-Y plane; and
rotational alignment is centered on the Z axis.

19. A continuously variable ratio beam splitter/beam launcher according to claim 19, in which:
first and second leaf springs in each positioner limit X axis and Y axis alignment movements to movements in a single X-Y plane;
each positioner is mounted to one location on the frame by angularly displaced third and fourth leaf springs which project away from that location at approximately 90° to each other;
and the third and fourth leaf springs confine yaw alignment movements and pitch alignment movements to a predetermined yaw alignment plane and a predetermined pitch alignment plane, respectively.

20. A continuously variable ratio beam splitter/beam launcher according to claim 14 in which each of the first four listed alignment adjustments comprises a compound differential screw adjustment device.

21. A continuously variable ratio beam splitter/beam launcher according to claim 20 in which all of the compound differential screws have interchangeable parts.

22. A continuously variable ratio beam splitter/beam launcher according to claim 20 in which each fiber optic cable includes a gradient index lens mounted in the end of the cable facing the optical array.

23. A continuously variable ratio beam splitter/beam launcher according to claim 22 in which the ratio adjustment means rotates the optical support about an axis located at a point on an extension of the input beam path beyond the optical divider means.

24. A continuously variable ratio beam splitter/beam launcher according to claim 23 in which the two output beam paths are aligned approximately at right angles to each other.

25. A continuously variable ratio beam splitter/beam launcher according to claim 14 in which the X, Y, pitch and yaw movements are all supported and maintained stable by leaf springs.

26. A variable ratio beam splitter according to claim 10 and further comprising means for demonstration of interference phenomena, comprising:
a pair of blocks slidably engageable with each other along mating linear surfaces;
each block including an elongated receptacle hole extending therethrough, for receiving the distal end of the optical fiber from one of the fiber optic cables, the receptacle holes each being aligned at an acute angle substantially smaller than 45° to the mating surfaces of the blocks;
the distal ends of the optical fibers being shaped to engage each other along the mating linear surfaces of the blocks with the tip of each optical fiber exposed at the end of its receptable aperture;
the exposed ends of each optical fiber ground and polished so as to refract the escaping light parallel to the mating surfaces of the blocks;
relative sliding motion between the two blocks being effective to demonstrate interference phenomena.

27. A continuously variable ratio beam splitter/beam launcher according to claim 12 in which each fiber optic cable has a gradient index lens mounted in the end of the cable facing the optical array.

28. A continuously variable ratio beam splitter/beam launcher according to claim 27 in which the ratio adjustment means rotates the optical support about an axis located at a point on an extension of the input beam path beyond the optical divider means.

29. A continuously variable ratio beam splitter/beam launcher according to claim 28 in which the ratio adjustment means further comprises:
a pivot pin, affixed to the optical support and having an axis corresponding to the axis of rotation, the pin projecting into a socket in the frame and also projecting above the support;
a leaf spring engaging the pin to hold the pin and support in alignment on the frame;
and an adjustment screw mounting the leaf spring on the frame.

30. A continuously variable ratio beam splitter/beam launcher according to claim 29 in which engagement between the pivot pin and the leaf spring is limited to a point contact.

31. A continuously variable ratio beam splitter/beam launcher according to claim 28, in which the ratio adjustment means further comprises an adjustment screw bearing on an inclined plane.

32. A continuously variable ratio beam splitter/beam launcher according to claim 1 in which the optical array means comprises:
optical divider means, in the input beam path, for dividing the input light beam into first and second intermediate beams directed along first and second intermediate paths within the optical array, the division of light between the two intermediate beams being dependent upon the angular alignment at which the input light beam impinges upon the divider means;
the first intermediate beam comprising the first output beam;
a right angle prism having first and second right-angle side surfaces and a hypotenuse surface; and
a penta prism having first and second right angle surfaces, the first right angle surface of the penta prism extending across the second intermediate beam path and the second right angle surface of the penta prism abutting the second side surface of the right angle prism to thereby launch the second output beam along a path extending outwardly from the first side surface of the right angle prism.

33. A continuously variable ratio beam splitter/beam launcher according to claim 32 in which:
the two output paths are angularly displaced from each other; and
the ratio adjustment means rotates the optical support to adjust the angle of incidence of the input beam path relative to the optical divider means.

34. A continuously variable ratio beam splitter/beam launcher according to claim 33 in which the ratio adjustment means rotates the optical support about an axis located at a point on an extension of the input beam path beyond the optical divider means.

35. A continuously variable ratio beam splitter/beam launcher according to claim 34 in which the two output beam paths are aligned approximately at right angles to each other.

36. A continuously variable ratio beam splitter/beam launcher according to claim 34 and further comprising:

first lens means, aligned with the first output path, for focusing the first output beam on the pickup portion of the first transmission element; and second lens means, aligned with the second output path, side for focusing the second output beam on the pickup portion of the second transmission element.

37. A variable ratio beam splitter according to claim 36 in which:

the first transmission element is a first fiber optic cable having one end mounted at the focal point for the first lens means, facing toward that lens means; and the second transmission element is a second fiber optic cable having one end mounted at the focal point for the second lens means, facing toward that lens means.

38. A continuously variable ratio beam splitter/beam launcher according to claim 37 in which each fiber optic cable has a gradient index lens mounted in the end of the cable facing the optical array as the associated lens means.

39. A continuously variable ratio beam splitter/beam launcher according to claim 1 in which each transmission element is an optical fiber cable having a lens mounted in a protective holder in one end of the cable, that one end of the cable constituting the pickup portion of the transmission element.

40. A continuously variable ratio beam splitter/beam launcher according to claim 39 in which the lens in each transmission element is a gradient index lens.

* * * * *